Patented June 16, 1953

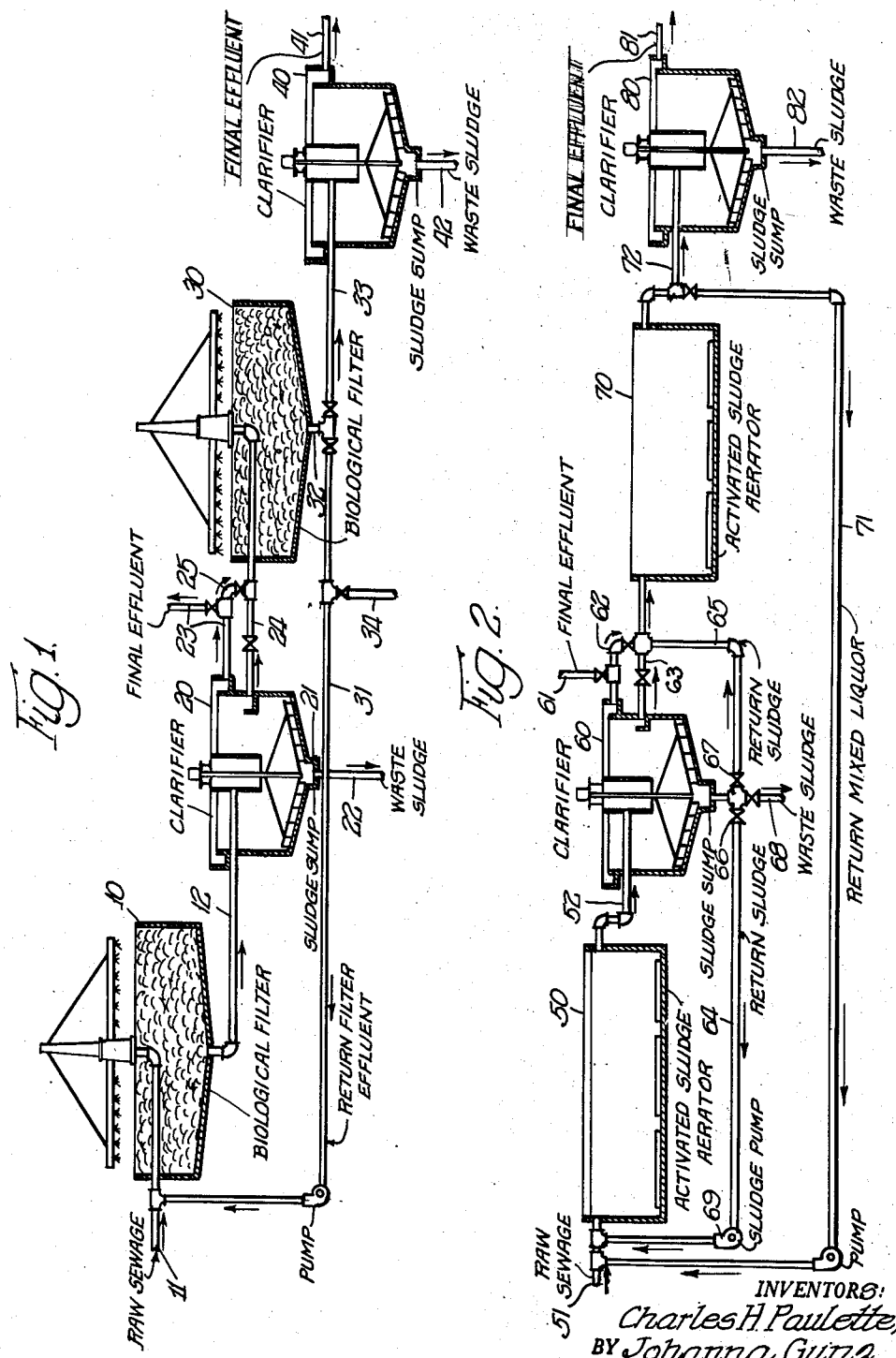

2,642,394

UNITED STATES PATENT OFFICE 2,642,394

TWO-STAGE AEROBIC BIOLOGICAL SEWAGE TREATING PROCESS AND SYSTEM

Charles H. Paulette and Johanna Gunz, Chicago, Ill., assignors to Infilco Incorporated, Chicago, Ill., a corporation of Delaware Application June 18, 1948, Serial No. 33,718

20 Claims. (Cl. 210—5)

This invention relates to the treatment of sewage and more specifically to treatment of sewage by what is usually called secondary treatment, as by biological oxidation treating devices.

It is an object of this invention to provide a sewage treating system including aerobic biological treating devices which is efficient and economical, and at the same time provides a large degree of flexibility.

Another object of the invention is to provide a process and system for the aerobic biological treatment of sewage in plural stages which permits eliminating certain parts or steps heretofore thought necessary for obtaining comparable results.

Another object is to provide a process and apparatus for the aerobic biological treatment of sewage in sequential stages, wherein fresh active bacteria from the second stage biological device are directly introduced into the first stage biological device and the raw sewage entering the first stage biological device is also simultaneously diluted by a liquid having a low B. O. D. and a low content of suspended solids.

Another object is to provide a plural stage aerobic biological sewage treating system wherein the effluent of the first stage is at least partially settled in an intermediate settler before being applied to the second stage, and wherein fully settled effluent is withdrawn to waste from the intermediate settler.

Another object is an aerobic process for biologically treating a strong sewage wherein the strong sewage is treated in a first biological step, the effluent from the first step is at least partially settled before being applied to a second biological step, and the effluent from the second biological step is at least partly returned to the first biological step prior to being clarified.

Another object of the invention is to provide a sewage treating system of high flexibility with regard to the degree of purification, which permits withdrawal of selective quantities of final effluent from different points in the system, depending on the degree of purification desired for any quantity of the sewage treated.

These and other objects of the invention will become apparent upon consideration of the description and claims which follow.

In the purification of sewage and other similar waste liquors by aerobic biological treating methods, such as by the activated sludge process, or on biological filters, it has been common practice to first settle the sewage to remove as much as possible of the settleable pollute prior to the biological treatment, thus reducing the load on the biological devices. The effluent of an aerobic biological treating device also carries large quantities of solids that must be separated from the liquid before the liquid can be discharged to waste, and which has usually been done by final settlers or clarifiers following such biological treating device or devices. In some systems, especially where recirculation of effluent is used, these clarifiers, or at least one of them, have to be quite large to provide sufficient holding time for the combined throughput and recirculation flow. In some cases, especially when dealing with strong waste waters, the primary and final clarifiers have been supplemented by an intermediary settler interposed between the primary and secondary aerobic biological treatment stages.

The use of these clarifiers obviously involves great cost. We have found that it also involves other disadvantages, which are apt to reduce the efficiency of the treatment. Sewage contains highly putrescible material which when held quiescent in the absence of air for a period of time, as in the lower strata of liquid in a clarifier, in subject to anaerobic decomposition. The aerobic biological treatment of sewage operates by decomposing sewage pollute with the aid of aerobic bacteria. Obviously, therefore, sewage that has undergone prolonged periods of sedimentation, with corresponding increase of anaerobic conditions, does not provide favorable environment for the optimum development and functioning of aerobic bacteria.

Another disadvantage of clarifying sewage prior to aerobic biological treatment is that certain foodstuffs contained in the sewage are thereby eliminated and consequently cannot be utilized and decomposed by the aerobic bacteria.

These drawbacks are avoided in the system of our invention, wherein the raw sewage may be passed without prior clarification to a first aerobic biological treating device. The sewage entering the first such biological device is therefore relatively fresh and provides suitable living conditions for aerobic bacteria, and the food contained in the sewage can be readily utilized by the bacteria. The increased load which is thus put on the activated sludge plant, or biological filter, as the case may be, is permissible and does not result in overloading of the biological treating device, or clogging of the filter, where the biological treating device consists in a filter, because in our system the raw sewage entering the first stage aerobic biological device is diluted by effluent from the aerobic biological device of the second stage. As will be seen more clearly hereafter, this effluent has no appreciable B. O. D. and suspended solids content, but contains fresh pollute hungry bacteria which have been previously somewhat underfed due to limited food supply available in the second stage. Thus the raw sewage is considerably diluted and at the same time the bacterial population of the first stage filter is greatly increased by active aerobic bacteria especially fit for decomposing large quantities of pollute.

Our invention will be understood more fully by reference to the drawings which represent flow sheets of the systems of our invention and wherein:

Figure 1 shows diagrammatically and in section a sewage treating system according to our invention utilizing trickling filters for the biological treatment; and Figure 2 shows diagrammatically and in section a similar system utilizing activated sludge aerators for the biological treatment.

A sewage plant as shown in Figure 1 comprises a raw sewage inlet 11 leading to a first biological filter 10 shown as being a trickling filter, but which may as well be a submerged aerobic biological filter. A filter outlet conduit 12 leads from the first filter 10 to an intermediate clarifier 20. The clarifier 20 may be of conventional design and may be provided with sludge raking mechanism and a sludge sump 21 in its bottom from which a sludge line 22 leads to any suitable place of sludge disposal. A clarified sewage conduit 23 leads from the upper portion of the clarifier 20 to waste. A conduit for partially clarified sewage 24 leads from an intermediate elevation of the clarifier 20 to the second biological filter 30. As shown, the clarified sewage conduit 23 may also have a branch conduit 25 leading to the second filter 30 whereby clarified sewage can be introduced thereto instead of, or in addition to, partially clarified sewage.

A filter effluent return line 31 leads from the outlet 32 of the secondary filter 30 to the inlet to the first filter 10 and may discharge either directly over the filter or into inlet conduit 11 as shown. We also show a conduit 33 connecting the filter outlet 32 to a final clarifier 40. A clarified sewage outlet 41 leads from an upper portion of the final clarifier 40 to waste, and a sludge outlet 42 leads from its lower portion to a suitable sludge disposal device, not shown. The final clarifier 40 will not regularly be needed in our system, as it is contemplated to return all of the secondary filter effluent to the primary filter and to withdraw clarified sewage from the intermediary clarifier 20. It is also contemplated to return in some cases only a portion of the secondary effluent to the primary filter and to discharge the balance directly from the secondary filter to waste. In such a case the conduit 33 may discharge to waste instead of being connected to clarifier 40, or a suitable waste line 34 may be branched off from the recirculation conduit 31. However, in some cases, where a very highly purified sewage is required, it may be desirable to provide a final clarifier 40. If all of the effluent must be of such high quality, all of the final effluent may be taken from the final clarifier 40 and the effluent conduit 23 from the first clarifier 20 will then be used only as a by-pass. Frequently, however, only a portion of the effluent will have to be so completely purified, while the balance may have a somewhat less complete treatment. In such cases the final clarifier need be only large enough for treatment of the portion of the throughflow requiring highest treatment and the balance can be withdrawn from the intermediate clarifier 20 through conduit 23 or from the second filter through branch conduit 34, or both. Taking final effluent from the intermediate clarifier has the advantage that the secondary filter can be smaller; on the other hand, final effluent taken from the secondary filter has the advantage of having a considerably lower B. O. D. than intermediate clarifier overflow, without appreciable increase in suspended solids thereover.

The operation of our system as applied to biological filters will be readily understood. The raw sewage entering our treating plant through inlet conduit 11 may previously have been passed through screens or comminuters, a grit chamber or primary settler, not shown, to remove coarse material, such as rags, pieces of metal, grit and the like, as is usual in the art. The sewage entering through inlet 11 is discharged over the first biological filter 10, and trickles therethrough. The sewage discharged over the first filter is diluted and inoculated by effluent from the second filter which has been purified to a high degree and carries fresh pollute hungry aerobic bacteria. On its course through the first filter 10 the mixture of raw sewage and secondary filter effluent is brought into contact with the aerobic organisms attached to the filter media and introduced with the effluent of the secondary filter 30 which feed on the organic pollute in the sewage and break it down to a stable form.

The sewage leaving the first filter carries large quantities of these stable decomposition products in solid form and also parts of the biological growth of the filter which is continuously sloughed from the filter material and flushed out by the sewage. This effluent is settled in the intermediate clarifier 20 and the sludge therefrom is withdrawn to waste. In a preferred form of our invention, all of the final effluent of the system is taken from the intermediate clarifier 20 and sent to waste through conduit 23. In this form of the invention it is contemplated to eliminate the final clarifier and return all of the effluent from the secondary filter to the primary filter. In this case the sewage entering the intermediate clarifier 20 will be composed of a mixture comprised of liquid that has passed only once through the first filter, and at least an equal quantity of liquid that has been subjected to two passes through the first filter, and has been settled and treated in the second filter between the two passes. Even with strong raw sewage the effluent of the clarifier 20 in such a system will have a B. O. D. and suspended solids content which are sufficiently low for most conditions of disposal.

In another form of our invention all the final effluent of the system is taken from the secondary filter 30 and sent to waste either through conduit 33 or through branch conduit 34. In this case the sewage sent to waste will be a mixture of liquid that has passed once through the first filter, the intermediate clarifier and the second filter and an equal quantity of liquid that has passed twice through these treating units. Whether it is preferable to take intermediate clarifier effluent or secondary filter effluent or a mixture of the two as final effluent will depend on such things as the quality of the sewage to be treated, the required degree of purification and clarification, and the local conditions of disposal.

Where conditions require a specially high degree of purification or where the sewage is exceptionally strong or difficult to purify, our preferred system may be supplemented by the final clarifier 40. The use of the final clarifier 40 provides high flexibility in meeting different conditions. Any desired part of the final plant effluent may be taken from the final clarifier, the balance being withdrawn from the first clarifier 20. The two effluents may be mixed to obtain a degree of purification averaging their individual degrees, and by varying the quantities withdrawn from either clarifier, most any degree of purification can be obtained. More frequently, however, the two effluents will be disposed of separately, where circumstances make this desirable. Thus, for example, where plant effluent is sold for industrial use requiring a very high degree of purification, only the quantity thus used will be sent to the final clarifier 40, while it may be permissible to dispose of the balance directly from the intermediate clarifier 20. Where a specially high degree of purification is required for all plant effluent, all of the final effluent will be taken from the final clarifier 40 and the conduit 23 from the clarifier 20 will in this case be used only as a by-pass.

Our sewage treating system is also very flexible with regard to the solids and B. O. D. content that are introduced into the secondary filter. When introducing clarified sewage from the upper portion of the intermediate clarifier 20 through conduit 25, the amount of solids will be quite insignificant and the secondary filter will serve mainly to convert dissolved and colloidal pollute to stable products. When taking the sewage from an intermediary level in the clarifier 20 through conduit 24, the filter will be dosed with partially clarified sewage, which still contains a considerable amount of solids and B. O. D. Finally, any solids and B. O. D. content between these two extremes may be obtained by withdrawing selective quantities of sewage from both levels. By providing the necessary valves, adjustment of solids content can be made during operation, as occasion arises.

In the preferred form of our system, wherein all the effluent of the secondary filter is returned to the primary filter, the secondary filter is preferably dosed with clarified sewage introduced through conduit 25. The effluent of the second filter will then have no appreciable B. O. D. and will be practically free of suspended solids, but will carry aerobic bacteria which are thus transplanted into the first filter. These bacteria have been on a semi-starvation diet in the secondary filter, due to the rather high degree of purification and clarification of the sewage entering the secondary filter, and are therefore pollute hungry and capable of vigorously attacking the large quantities of food available in the raw sewage supplied to the first filter.

Obviously, where secondary filter effluent is used as final plant effluent and is discharged directly to waste without clarification, the second filter will also be dosed with clarified sewage, to keep the suspended solids content of the final effluent low.

Where a second clarifier is provided, the quantity of solids introduced into the secondary filter may be controlled to any desired value by dosing the filter with a mixture of clarified and partially settled sewage or only with partially settled sewage taken from a suitable elevation in the intermediate clarifier 20.

Obviously, if desired, the raw sewage can be settled in a preliminary clarifier, not shown, prior to applying it to the first filter 10. Where a settler is readily available therefor, its use will further improve the results of our process. However, ordinarily, a primary clarifier need not be used in our system even with very strong sewages, and good purification still will be obtained. In the saving of this equipment resides one of the advantages of the system.

The benefits and advantages of our invention will be better appreciated by reference to a specific example. Assuming a raw sewage 5 day B. O. D. of 400 p. p. m. After the usual initial operation period required for growth and development of bacterial flora in the two filters, based on conservative B. O. D. removal estimates of 70% in the first stage and 60% in the second stage and with 100 percent recirculation the B. O. D. of the mixture of raw sewage and recirculated second stage effluent reaching the first stage will be diluted to about 213 p. p. m. With 70% removed through the first stage treatment and the intermediate clarifier the B. O. D. of the sewage reaching the second stage would be of the order of 64 p. p. m. and with 60% removal through the second stage the final B. O. D. will be less than 26 p. p. m. as used as diluent for the strong raw sewage. Final effluent withdrawn from the intermediate clarifier in this example would have a B. O. D. of 64 p. p. m. and where a sufficiently large receiving body of water for dilution is available we contemplate using the preferred form of our invention, taking all final plant effluent from the intermediate clarifier 20 and omitting the final clarifier 40. Where a lower B. O. D. is required the intermediate clarifier effluent may be diluted with a suitable quantity of secondary filter effluent or, if a final clarifier is provided, of final clarifier effluent. Thus it will be seen, that our system lends itself to providing any desired degree of purification.

The system of Figure 2 representing our invention as applied to an activated sludge treatment, is quite similar in construction and operation to that of Figure 1. Unsedimented raw sewage, which has been freed of coarse materials in the usual manner, enters the plant through a sewage inlet 51 discharging into an activated sludge aeration basin 50. The aeration basin 50 may be of the diffused air type, as diagrammatically indicated in the drawing, or other suitable aerating means, such as mechanical aerators may be used. A mixed liquor conduit 52 leads from the aeration basin 50 to an intermediate clarifier 60. The clarifier 60 may be provided with a sludge scraping mechanism and the usual sludge sump in its bottom. A clarified sewage conduit leads from the upper portion of the clarifier 60 and has one branch 61 discharging to waste and another branch 62 connected to the inlet of a second activated sludge aeration basin 70, in which may be utilized the same or a different type of aerator as in the first aeration basin 50. A conduit 63 may lead from a suitable intermediate elevation of the intermediate clarifier 60 to the inlet of the second aeration basin 70 to provide a means for introducing partially clarified sewage to the second activated sludge aeration basin. Settled sludge will be withdrawn from the bottom of the intermediate clarifier 60 and a part thereof returned to each of the two aeration basins as through return sludge line 64 by means of a sludge pump 69, and through return sludge line 65 by gravity flow. The sludge return lines 64 and 65 are provided with valves 66 and 67, respectively. The excess sludge is withdrawn to waste through a valved waste sludge line 68. From the outlet of the second aeration basin a return mixed liquor conduit 71, having a suitable valve and a recirculation pump associated therewith, leads to the sewage inlet to the first aeration basin 50. The outlet of the second aeration basin 70 is also shown in Figure 2 connected by a conduit 72 to a final clarifier 80 having a clarified sewage outlet 81 and a waste sludge outlet 82. The final clarifier 80 will not regularly be needed in our system, as it is contemplated to return the entire effluent from the secondary aeration basin 70 through return mixed liquor conduit 71 to the primary aeration basin 50, and to withdraw all final plant effluent from the intermediate clarifier 60 through conduit 61 to waste. However, where very highly purified effluent is required the final clarifier can be provided, and as in the embodiment of our invention utilizing trickling filters, and depending on the specific conditions of the plant, selective quantities of final effluent can then be withdrawn from the two clarifiers, or all final effluent be taken from the final clarifier. Our activated sludge treating system provides the same flexibility with regard to the solids and B. O. D. content that are introduced into the second aerator basin as our trickling filter system. By connecting the second aerator basin 70 to the clarified sewage outlet of clarifier 60 by conduit 62 and also to the outlet from an intermediate level of the clarifier 60 by conduit 63, any desired quantity of solids and B. O. D. can be passed to the second aerator 70. By providing suitable valves on the conduits 62 and 63 the quantities can be regulated and varied during operation.

The operation of our activated sludge plant is in general the same as that of our trickling filter plant. However, it will be obvious that in this embodiment of our invention final effluent can be taken only from the clarifiers, but not from the secondary aeration basin. Further, only a minor portion of the sludge from the intermediate clarifier is wasted, while the major portion is used as return activated sludge for the first and second stage aeration steps.

In the preferred form of our invention as applied to activated sludge treatment where all of the unsedimented secondary aeration basin effluent is returned to the first aeration basin it is preferred to operate with low sludge concentrations in the secondary aeration basin by passing clarified sewage and only a relatively small amount of return sludge from the intermediate clarifier to the second stage aeration basin. The mixed liquor from the secondary aeration stage will then have a relatively low B. O. D. and suspended solids content, and will contain pollute hungry, active aerobic bacteria which are capable of vigorously attacking the large quantities of food in the raw sewage entering the first aeration stage. By this interchange of bacteria between stages of meager diet and rich diet, the bacterial population is continuously reactivated.

It will be seen that we have provided a process of aerobic biological treatment of sewage which requires a minimum of equipment, but is efficient, simple in operation, and provides highest flexibility of operation so that it can be easily adjusted to any standard, or change in standards of purification. One of the advantages of our invention lies in the fact that conventional equipment which is available in most sewage treating plants, can be used in carrying out the invention by simple changes in existing connections, and with the addition of a few new connections between the several units.

While we have shown and described several preferred embodiments of our process and system, we wish it to be understood that many modifications of our invention will suggest themselves to those skilled in the art which can be incorporated in our system and process without departing from the spirit and scope thereof.

We claim:

1. A sewage treating system comprising a first biological aerobic treating device, a clarifying device and a second biological aerobic treating device, said devices being joined for flow therethrough in the sequence mentioned, inlet means for sewage to be treated to said first biological aerobic treating device, an outlet conduit for unsedimented effluent leading from said second biological aerobic treating device, means including a conduit for returning to said first biological aerobic treating device unsedimented effluent from said second biological aerobic treating device, an outlet for sludge from said clarifying device, and means for withdrawing treated sewage from said system downstream of said clarifying device.

2. The system of claim 1, wherein said biological treating devices are biological filters.

3. The system of claim 1, wherein said biological treating devices are activated sludge aerators, said system including also return sludge conduit means from said clarifying device to each of said aerators.

4. A sewage treating system comprising a first biological treating device, a raw sewage inlet to said first biological treating device, a clarifying device, a conduit from said first biological treating device to said clarifying device, a second biological treating device, means for introducing selective quantities of solids in sewage coming from said clarifying device to said second biological treating device, said means including flow conduits from an upper and intermediate level of said clarifying device and discharging to said second biological device, and valves associated with said flow conduits, a second clarifying device, a conduit for unsedimented liquid from said second biological treating device to said second clarifying device, a clarified sewage outlet from said second clarifying device to waste, means including a conduit for returning to said first biological treating device a portion of the unsedimented liquid conveyed by said conduit for unsedimented liquor prior to sedimentation thereof in said second clarifying device, and means for withdrawing sludge from each of said clarifying devices.

5. A sewage treating system comprising a first aerobic biological filter, a sewage inlet discharging over said filter, an outlet from said first filter, a clarifier having an inlet, a conduit connecting said first filter outlet to said clarifier inlet, said clarifier having a clarified sewage outlet, a sludge outlet, and an outlet for partially clarified sewage, a second aerobic biological filter having an inlet discharging over said second filter, conduit means connecting said outlet for partially clarified sewage to the inlet of said second filter, an outlet from said second filter, a second clarifier having an inlet, conduit means connecting said second filter outlet to said second clarifier inlet, means including a conduit for conveying to the first filter inlet a predetermined portion of unsedimented secondary filter effluent, a clarified sewage outlet from said second clarifier, means for withdrawing sludge from said clarifiers, and means including valves on said clarified sewage outlets, for regulating the quantities of clarified sewage withdrawn to waste through each of said clarified sewage outlets.

6. A sewage treating system comprising in sequence a first trickling filter, an intermediate clarifier, a second trickling filter, a final clarifier, conduit means connecting said units in the sequence mentioned, an inlet for sewage to be treated into said first trickling filter, an outlet to waste from said final clarifier, characterized by conduit means conveying unsedimented secondary filter effluent to the primary filter, and a pump associated with said last mentioned conduit means.

7. A sewage treating system comprising a first trickling filter having an inlet for sewage to be treated and an outlet; an intermediate clarifier having an inlet connected to said outlet of said first trickling filter, a sludge outlet from said intermediate clarifier, a clarified liquid outlet from said intermediate clarifier, a second trickling filter having an inlet, and having an outlet for unsedimented liquid, conduit means connecting said clarified liquid outlet to waste and to the inlet of said second trickling filter, flow control means associated with said conduit means and regulating the quantity of clarified sewage passing to the second trickling filter and to waste, respectively, a second clarifier having an inlet and a clarified liquid outlet to waste, conduit means connecting said outlet from said second trickling filter with the inlets of said second clarifier and of said first trickling filter, flow control means associated with said last mentioned conduit means and regulating the quantity of unsedimented effluent from said second trickling filter returned to said first trickling filter and the quantity passing through said second clarifier, respectively, and a sludge outlet from said second clarifier.

8. A sewage treating system comprising a raw sewage inlet, a first stage aerobic biological treating device having an outlet for unsedimented effluent, a second stage aerobic biological treating device having an outlet for unsedimented effluent, and a clarifying device interposed in the sewage flow from said first to said second biological device, an inlet to said first biological device connected to said raw sewage inlet, conduit means for conveying unsedimented effluent of said second biological device to said first biological device, a sludge outlet from a lower portion of said clarifying device, a liquid outlet from a portion of said clarifying device spaced above said sludge outlet, an inlet into said second stage aerobic biological treating device connected to the liquid outlet of said clarifier, and conduit means for withdrawing treated sewage from said system downstream of said clarifying device.

9. A sewage treating system comprising the combination of a first trickling filter, a raw sewage inlet discharging to said first filter, a filter outlet, an intermediate clarifier, said intermediate clarifier having an inlet connected to said filter outlet, a sludge outlet, a clarified liquid outlet and an outlet for partially clarified liquid, a second trickling filter having an inlet connected to said clarified liquid outlet and to said outlet for partially clarified liquid, an outlet for unsedimented liquid from said second trickling filter, a final clarifier, said final clarifier having an inlet connected to said second trickling filter outlet, a sludge outlet and a clarified liquid outlet, sewage transfer means conveying unsedimented sewage from said second trickling filter outlet to said final clarifier inlet and to said raw sewage inlet, and waste conduits from the said clarified liquid outlets and the said sludge outlets.

10. An activated sludge type sewage treating plant comprising a first aeration basin, an intermediate clarifier basin, a second aeration basin and a final clarifier basin, means for aerating sewage in said aeration basins, conduits connecting said basins in such manner that sewage may flow therethrough in the sequence mentioned, a return conduit for unsedimented mixed liquor from a point downstream of the second aeration basin and upstream of the final clarifier basin to said first aeration basin, a return sludge conduit from said intermediate clarifier basin to each of said aeration basins, flow regulating means associated with said return mixed liquor conduit and said return sludge conduits, and conduit means from each of said clarifiers for withdrawing clarified sewage to waste and for withdrawing sludge to waste.

11. An activated sludge sewage treating system comprising a first aeration basin, an intermediate clarifying basin, a second aeration basin and a final clarifying basin, each of said basins having an inlet and an outlet for sewage treated therein, aerating means in said aeration basins, conduit means connecting the said inlets and outlets of said basins for flow therethrough in the sequence stated, a raw sewage inlet, conduit means connecting said raw sewage inlet and the outlet of said second aeration basin to the inlet of said first aeration basin, a sludge sump in the bottom of each of said clarifying basins, return sludge conduits from the sump of said first clarifying basin to each of said aeration basin inlets, a waste sludge line from each of said clarifying basins, and a clarified sewage outlet to waste from said second clarifying basin.

12. The system of claim 11 including also a clarified sewage outlet to waste from said first clarifying basin.

13. An activated sludge sewage treating plant comprising the combination of a first aeration basin, a clarifier and a second aeration basin, means for aerating sewage in said aeration basins, a raw sewage inlet to said first aeration basin, a mixed liquor conduit from the outlet portion of said first aeration basin to the inlet portion of said clarifier, a clarified sewage conduit from an upper level of said clarifier to the inlet of said second aeration basin, a return sludge conduit from a lower level of said clarifier to the inlets of said aeration basins, a partially clarified sewage conduit leading from a level of said clarifier intermediate said upper and lower levels and discharging to said inlet of said second aeration basin, a mixed liquor return conduit from the outlet of said second aeration basin to the inlet of said first aeration basin, an outlet for waste sludge from said clarifier, and means for discharging clarified liquid from said clarifier to waste.

14. An aerobic biological sewage treating process comprising the steps of inoculating a first stage aerobic biological sewage treating zone with aerobic bacteria taken from a second stage aerobic biological treating zone that have previously been underfed in said second stage treating zone and are thereby enabled to decompose large quantities of pollute, applying strong sewage to said first stage treating zone, thereby providing a rich food supply for bacteria in said first stage treating zone, separating in a clarifying zone the solid products of bacterial decomposition from the sewage treated in said first stage treating zone and utilizing a portion of the clarified sewage having a low B. O. D. and suspended solids content as the food supply in said second stage aerobic biological treating zone, and withdrawing another portion of said clarified sewage to waste.

15. A sewage treating process comprising the steps of diluting and inoculating raw sewage entering a first aerobic biological treating zone with treated sewage returned directly from a second aerobic biological treating zone, said returned sewage having a low B. O. D. and suspended solids content and carrying fresh active pollute hungry aerobic bacteria, passing the mixture of raw and treated sewage through said first aerobic biological treating zone, clarifying the effluent of said first treating zone, passing the clarified effluent to and through said second aerobic biological treating zone, clarifying a portion of the effluent of said second aerobic biological treating zone and withdrawing it from the system, and using another portion of the second aerobic biological treating zone effluent in unclarified condition as said treated sewage which is returned to said first aerobic biological treating zone for diluting and inoculating the raw sewage therewith.

16. The process of claim 15 wherein a portion of the clarified effluent from said first aerobic biological treating zone is withdrawn to waste.

17. A sewage treating process comprising treating raw sewage in a first aerobic biological treating zone with the aid of aerobic bacteria, clarifying treated effluent from the first aerobic biological treating zone in a clarifying zone, passing sewage from said clarifying zone to a second aerobic biological treating zone and treating it therein with the aid of aerobic bacteria, selectively controlling the amount of solids passed with said sewage from said clarifying zone to said second aerobic biological treating zone, returning a portion of the unsedimented effluent from said second aerobic biological treating zone carrying fresh aerobic bacteria directly to said first aerobic biological treating zone and diluting raw sewage entering said first zone with said effluent and inoculating it with said fresh aerobic bacteria, withdrawing sludge from said clarifying zone to waste and withdrawing the balance of said second aerobic biological treating zone effluent to waste.

18. The process of claim 17 wherein said balance of the second zone effluent is settled prior to being wasted.

19. An activated sludge sewage treating process comprising aerating and agitating raw sewage in a first aeration zone in the presence of activated sludge, clarifying the mixed liquor from said first aeration zone in a first clarifying zone, then aerating and agitating the sewage in a second aeration zone in the presence of activated sludge and clarifying the mixed liquor from the second aeration zone in a second clarifying zone, characterized by the steps of passing a portion of settled sludge from said first clarifying zone to each of said aeration zones as the source of said activated sludge, passing a portion of the mixed liquor from the second aeration zone prior to its clarification to said first aeration zone, and controlling the amount of solids entering said second aeration zone in sewage and sludge from said first clarifying zone to a value considerably lower than the amount of solids entering said first aeration zone with the raw sewage, and with sludge and mixed liquor returned thereto from said first clarifying zone and said second aeration zone, respectively, and withdrawing controlled amounts of clarified sewage from said clarifiers to waste.

20. A process of purifying sewage comprising the steps of passing raw sewage through a first stage biological aerobic filter in admixture with, and diluted by, unsedimented effluent from a second stage biological aerobic filter, said second stage filter effluent being rich in aerobic bacteria and having a low B. O. D. and suspended solids content, clarifying the effluent of the first stage filter, passing clarified first stage effluent through a second stage biological aerobic filter, using at least a portion of the second stage filter effluent as the source of said unsedimented second stage filter effluent for admixture to, and dilution of, the raw sewage passing through the first stage filter, and selectively withdrawing treated sewage prior to or after the second filtration.

CHARLES H. PAULETTE.
JOHANNA GUNZ.

References Cited in the file of this patent

UNITED STATES PATENTS

| Number | Name | Date |
|---|---|---|
| 2,142,196 | Langdon | Jan. 3, 1939 |
| 2,168,208 | Jenks | Aug. 1, 1939 |
| 2,258,398 | Ward | Oct. 7, 1941 |
| 2,348,126 | Green | May 2, 1944 |
| 2,366,917 | Levine | Jan. 9, 1945 |
| 2,388,795 | Montgomery et al. | Nov. 13, 1945 |
| 2,391,494 | Walker | Dec. 25, 1945 |
| 2,404,223 | Durdin | July 16, 1946 |
| 2,419,492 | Green | Apr. 22, 1947 |
| 2,436,584 | Logan | Feb. 24, 1948 |
| 2,457,057 | Mallory | Dec. 21, 1948 |
| 2,458,163 | Hays | Jan. 4, 1949 |

OTHER REFERENCES

Sewerage and Sewage Treatment by Babbitt, 6th Edition (1947), page 479.